United States Patent
Sperber

(10) Patent No.: US 7,315,355 B2
(45) Date of Patent: Jan. 1, 2008

(54) METHOD AND DEVICE FOR OPTICAL DISTANCE MEASUREMENT

(75) Inventor: Peter Sperber, Viechtach (DE)

(73) Assignee: Micro-Optronic-Messtechnik GmbH, Langebruck (DE)

( * ) Notice: Subject to any disclaimer, the term of this patent is extended or adjusted under 35 U.S.C. 154(b) by 159 days.

(21) Appl. No.: 10/897,055

(22) Filed: Jul. 22, 2004

(65) Prior Publication Data

US 2005/0030221 A1 Feb. 10, 2005

Related U.S. Application Data

(63) Continuation of application No. PCT/DE03/00166, filed on Jan. 21, 2003.

(30) Foreign Application Priority Data

Jan. 23, 2002 (DE) ............... 102 02 672
Jun. 26, 2002 (DE) ............... 102 28 644

(51) Int. Cl.
*G01C 3/08* (2006.01)
(52) U.S. Cl. .................... 356/5.11; 356/5.15
(58) Field of Classification Search ............ 356/4.01, 356/5.01–5.15, 28, 28.5
See application file for complete search history.

(56) References Cited

U.S. PATENT DOCUMENTS

| | | | |
|---|---|---|---|
| 3,202,988 A | | 8/1965 | Fombonne |
| 3,246,322 A | | 4/1966 | Kuecken |
| 3,343,157 A | * | 9/1967 | Charton et al. ............. 341/111 |
| 3,730,628 A | * | 5/1973 | Wolcott et al. ............ 356/5.11 |
| 4,107,684 A | * | 8/1978 | Watson, Jr. .................. 342/86 |
| 4,170,023 A | | 10/1979 | Yamakoshi et al. |
| 4,370,653 A | * | 1/1983 | Crowley ...................... 342/42 |
| 4,374,438 A | * | 2/1983 | Crowley ..................... 455/265 |
| 4,562,403 A | | 12/1985 | Donovan |
| 5,771,255 A | * | 6/1998 | Horiuchi et al. ............. 372/31 |
| 6,058,318 A | * | 5/2000 | Kobayakawa et al. ... 455/562.1 |

FOREIGN PATENT DOCUMENTS

EP 1 152 259 A2 11/2001

OTHER PUBLICATIONS

U. Tietze, Ch. Schenk: "Halbleiter-Schaltungstechnik" 1993, Springer-Verlag, Berlin, pp. 959-961.

\* cited by examiner

*Primary Examiner*—Isam Alsomiri
(74) *Attorney, Agent, or Firm*—Alston & Bird LLP

(57) ABSTRACT

A method and a device for optically measuring a distance by emitting an amplitude modulated and bundled optical signal and by receiving the signal reflected from a target object. The modulation frequency is continuously regulated by means of a regulating loop in such a manner that between the emitted and the received signal a fixed phase difference prevails that is independent of the distance. For reducing the circuitry required for a distance evaluation circuit, while maintaining a high accuracy and for increasing the attainable regulation speed, the detection of the phase difference occurs with a phase comparator.

24 Claims, 1 Drawing Sheet

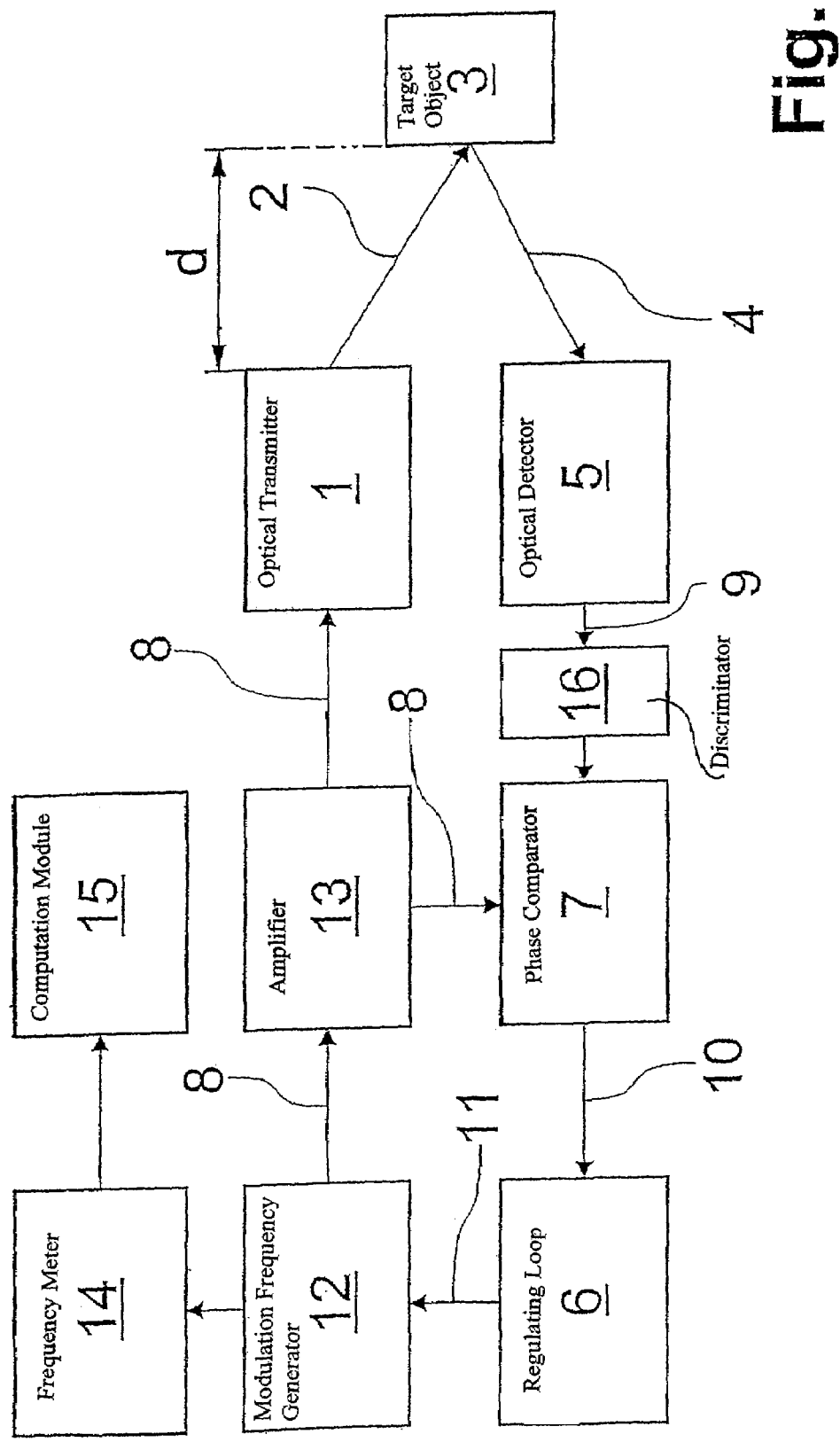

METHOD AND DEVICE FOR OPTICAL DISTANCE MEASUREMENT

CROSS REFERENCE TO RELATED APPLICATION

The present application is a continuation of international application PCT/DE03/00166, filed 21 Jan. 2003, and which designates the U.S. The disclosure of the referenced application is incorporated herein by reference.

BACKGROUND OF THE INVENTION

The present invention relates to a method and a device for optically measuring a distance.

EP 1 152 259 A2 discloses an optical distance sensor, which permits determining the distance between the optical distance sensor and a target object. Optical distance sensors of this type are used, for example, in industrial quality controls or manufacturing processes, where metal sheet thicknesses or distances of semiconductor plates from a tool are to be detected. Furthermore, optical distance sensors are used for positioning objects, for example, in the case of elevator installations, where the elevator car is to be positioned in each floor in a desired position. Likewise in storage systems it is necessary to position the access systems in an accordingly accurate manner for accessing stored goods.

For determining the phase shift between emitted and received light beams, the optical distance sensor as disclosed in EP 1 152 259 A2 uses in its distance evaluation circuit a synchronous rectifier, which supplies a voltage proportionate to the phase difference. The voltage as output by the synchronous rectifier is used to regulate a final control element, so that the voltage reaches a predetermined value.

A thus-realized regulation is a continuous regulation that requires a large amount of circuitry. To obtain an adequately accurate and rapid regulating loop, it becomes moreover necessary to further increase the required circuitry.

It is therefore an object of the present invention to provide and further develop a method for optically measuring a distance, wherein the required circuitry for the distance evaluation circuit may be reduced, while maintaining a high accuracy, and wherein the regulating speed can be further increased.

SUMMARY OF THE INVENTION

The above and other objects and advantages of the present invention are achieved by the provision of a method and a device for optically measuring a distance which includes emitting an amplitude modulated and bundled optical signal, and receiving the signal reflected from the target object. The modulation frequency is continuously regulated by means of a regulating loop, so that between the emitted and the received signal, a fixed phase difference prevails that is independent of the distance.

In accordance with the invention, it has been found that it is possible to reduce the required circuitry of the distance evaluation circuit quite significantly, when a phase comparator replaces the synchronous rectifier that is used in the corresponding circuit of the optical distance sensor disclosed in EP 1 152 259 A2. The phase comparator compares only whether an actually present phase difference is too great or too small. The phase comparator releases a corresponding signal, which is used, via a regulating loop, for increasing or decreasing the modulation frequency of the amplitude modulated optical signal.

As regards the accuracy of the phase comparator, it is provided to configure it such that it exhibits a high phase resolution at an interval around a desired phase or around a desired phase difference. The phase positions outside this interval need not be detected with a high accuracy. The interval may extend only over a small range around the desired phase. Preferably, for a phase comparator that is usable for different applications, the interval limits can be variably adjusted. With the measures of the present invention it becomes possible to increase the measuring accuracy clearly when compared with conventional phase measuring methods on the one hand, and to reduce the required circuitry significantly on the other hand.

Quite generally, the phase comparator compares whether the measured phase is greater or smaller than a desired phase difference. In this connection, it is preferred to predetermine the desired phase difference. Also, it is thus ensured that the desired phase difference is flexibly adjustable to the respective application of the particular optical distance measurement. Corresponding input arrangements are provided for varying the desired phase difference in the circuit.

Preferably, the phase comparator outputs its measuring result in the form of digital information. Encoded in the digital information is that the actually detected phase difference is greater or smaller than the desired phase difference. The actual amount of the respective deviation from the desired phase difference does not matter for the time being.

Based on the output of the phase comparator, namely that the actually detected phase difference is smaller or greater than the desired phase difference, it is possible to realize the regulating loop as a two-position control. In so doing, the modulation frequency is continuously varied. The amount of the variation rate is constant. Depending on the output of the phase comparator, the sign may be negative or positive. In other words, the modulation frequency is either continuously increased or decreased. A regulation is possible and basically provided each time after the phase comparator outputs a measured value. Preferably, the modulation frequency is increased or decreased at a constant rate. The rate may be adjustable depending on the measuring task.

If the time sequence of the regulating signals of the two-position control is shorter than the adjustment time of the modulation frequency generator that provides the modulation frequency, it will be possible to utilize for the regulation the inertia of the modulation frequency generator, which is caused by the longer adjustment time. In this process, the actually adjusted modulation frequency will fluctuate in a small frequency range about the desired value of the modulation frequency that is to be adjusted, in particular when the detection cycle of the phase comparator is adapted or adjusted to this end. Based on the output of the phase comparator, the control voltage on the modulation frequency generator is either increased or decreased, i.e., the control voltage does not remain constant. Even when because of the two-position control, the modulation frequency fluctuates about the desired value, and ultimately is not exactly adjustable alone with the aid of the phase comparator, it will yet be possible to adjust the desired value accordingly, namely after averaging the fluctuation of the modulation frequencies provided by the modulation frequency generator over a predeterminable measuring time. In a particularly advantageous manner, this permits drastically increasing the sensitivity of the regulation in the vicinity of the desired value of the phase difference when compared with a continuous phase measurement.

At the beginning of the measuring procedure, the modulation frequency is varied starting from a predeterminable initial value, until the phase comparator detects the reaching of a desired—if need be, likewise predeterminable—phase difference. For example, it would be possible to set the initial value to a modulation frequency, which is smaller than the modulation frequency that is to be expected and corresponds to the desired phase difference or set-point phase difference. In this case, the initial modulation frequency would have to be increased, until the phase comparator detects the reaching of the desired phase difference. In this connection, it may be necessary to adjust the predeterminable initial value approximately to the value that corresponds to the distance from the test object, which is to be expected or measured. A relative movement between the test object and the optical distance-measuring device does not alter the duration of the adjustment phase.

As a modulation signal, one uses quite generally a periodic signal, for example, a sinusoidal signal. In a very particularly preferred manner, a pulse train signal is used as modulation signal. In this case, the respective pulse duration could correspond to the respective duration between two successive pulses, or the pulse train signal could be composed of short pulses. In the latter case, the pulse duration is shorter than the duration between two successive pulses. A pulse train signal permits realizing in a particularly advantageous manner very rapid signal rise times, thereby further increasing the accuracy of the phase detection in the range of interest. With that, it is possible to reach bandwidths, which are unreachable with the phase measuring methods of the art because of the ambiguities inherent in these methods. Possible amplitude fluctuations of the pulses are electronically compensated with a delayed symmetry discriminator, which permits minimizing detection artifacts.

Concretely, the regulation of the modulation frequency occurs with the aid of the regulating loop such that the phase difference is constantly regulated between a received pulse and a subsequent pulse that is to be emitted.

The transit time t of the optical signal to and from the test object is computed as an integral multiple of the period duration dt of the emitted signal according to the formula $$t=n*dt.$$

The integer n may assume values between 1 and large numbers, i.e., the phase difference is always greater than 360 degrees. In this process, it is also necessary to consider a fixed offset that is to be determined by calibration, and which has not been taken into account in the foregoing formula for the sake of simplicity. If the integer n assumes the value 1, there will be no ambiguity of the measurement. In this case, the phase difference is constantly regulated between a received pulse and the subsequent pulse that is to be emitted. If the integer n is greater than 1, it will be possible to eliminate ambiguities by relatively inaccurate preliminary measurements—should rapid measuring times be required for great measuring distances. The distance being measured will then be determined as a product of the single transit time t/2 at the light speed prevailing in the particular medium. Basically, the circuit predetermines the phase difference.

By measuring the modulation frequency, which results in the period duration, the distance from the target object is computed. In this case, the measurement is a direct frequency measurement, wherein it is possible to perform with the method of the invention a very fast averaging by way of extremely many measurements of the pulse transit time. Advantageously, the time for a single measurement must be no longer than the signal transit time to and from the target object. Thus, the measuring times for reaching a high measuring accuracy are by far shorter than in the case of methods for measuring mere pulse transit times with a subsequent averaging by way of individual measurements.

In the following, a concrete embodiment of the device for optically measuring a distance in accordance with the invention is described. In this device, a modulation frequency signal is generated with a VCO (voltage-controlled oscillator). An amplifier following the VCO amplifies the VCO-generated modulation frequency signal. With the thus-amplified modulation frequency signal, a light source is amplitude modulated. As a light source one could use an LED (light emitting diode) or a laser. In this connection, it is common to use light sources, whose wavelengths are in the red or infrared wavelength range. Should the light source have a high divergence, it would be possible to bundle or collineate the light of the light source with a focusing means, preferably with a lens and/or a reflector mirror.

For detecting the light reflected from the target point, the detector could include a photodiode, provided the target object has a retroreflector. Otherwise, the detector is provided with an avalanche diode or a photomultiplier. It is preferred to use the avalanche diode or the photomultiplier, when the distance being measured is very great, and consequently, the intensity of the light being detected is very low and/or the target object reflects only little light in the direction of the detector because of an optical scattering.

The phase comparator is used to determine the relative phase position between the modulation frequency signal and the detector output signal. The output signal of the phase comparator is supplied to the regulating loop, which is used to generate a correction signal for the modulation frequency generator. The measurement of the modulation frequency is used to compute the distance between the device according to the invention and the target object.

There exist various possibilities of improving and further developing the teaching of the present invention in an advantageous manner. To this end, reference may be made to the following description of a preferred embodiment of the invention with reference to the drawing. In conjunction with the description of the preferred embodiment of the invention with reference to the drawing, also generally preferred improvements and further developments of the teaching are explained.

BRIEF DESCRIPTION OF THE DRAWING

The one FIGURE is a schematic view of an embodiment of a device according to the invention for optically measuring a distance.

DETAILED DESCRIPTION OF A PREFERRED EMBODIMENT

The device for optically measuring a distance emits via an optical transmitter 1 an amplitude modulated optical signal 2. An optical detector 5 detects a signal 4 that is reflected from a target object 3, with the target object being located at a distance d from the device for optically measuring the distance. The modulation frequency is continuously regulated via a regulating loop 6 such that between the emitted signal 2 and the received signal 4, a fixed phase difference prevails that is independent of the distance d.

In accordance with the invention, a detection of the phase difference occurs with a phase comparator 7 that compares, whether the measured phase is greater or smaller than a desired phase difference. Concretely, the phase comparator 7 determines a relative phase position between a modulation frequency signal 8 that is amplified by an amplifier 13, and a detector output signal 9. The phase comparator 7 outputs digital information 10, which corresponds to a positive or a negative voltage. This digital output signal 10 of the phase comparator 7 is supplied to the regulating loop 6. The regulating loop 6 is realized as a two-position control, which generates a correction signal 11 for a modulation frequency generator 12. As a modulation signal, a periodic signal is used, which is a pulse train signal and consists of short pulses.

A VCO 12 (voltage controlled oscillator) generates or makes available the modulation frequency signal 8, which is amplified by the amplifier 13. The amplified modulation frequency signal 8 is used to amplitude-modulate the light source or the optical transmitter 1. As a result of measuring the modulation frequency with a frequency meter 14, the distance d between the device and the target object 3 is computed in a module 15.

A discriminator 16 may be arranged between the optical detector 5 and the phase comparator 7.

Finally, it should be expressly noted that the above described embodiment serves to describe only the claimed teaching, without however limiting it to the embodiment as specifically disclosed.

The invention claimed is:

1. A method for optically measuring a distance comprising the steps of emitting an amplitude modulated and bundled optical signal, and receiving the signal reflected from the target object, wherein the modulation frequency is continuously regulated via a regulating loop in such a manner that between the emitted and the received signal a fixed phase difference prevails that is independent of the distance, wherein the detection of the phase difference occurs via a phase comparator in such a manner that the phase comparator only compares whether the measured phase difference is greater or smaller than a desired phase difference, and wherein the regulating loop comprises a two-position control, which changes only the sign of the variation rate of the modulation frequency.

2. The method of claim 1, wherein the phase comparator has a high phase resolution at an interval around a desired phase difference, with the resolution being adjusted via a feedback amplification.

3. The method of claim 1, wherein the phase difference is predetermined by a circuit.

4. The method of claim 1, wherein the phase comparator outputs digital information.

5. The method of claim 1, wherein the time sequence of the regulating signals of the two-position control are shorter than the adjustment time of a modulation frequency generator that provides the modulation frequency.

6. The method of claim 1, wherein at the beginning of the measuring procedure the modulation frequency is varied from a predeterminable initial value until the phase comparator detects the reaching of a desired or the set-point phase difference.

7. The method of claim 1, wherein the modulation signal comprises a periodic or sinusoidal signal.

8. The method of claim 1, wherein a pulse train signal is used as a modulation signal.

9. The method of claim 8, wherein the pulse train signal is composed of short pulses.

10. The method of claim 8, wherein the amplitude fluctuations of the pulses are compensated with a delayed symmetry discriminator.

11. The method of claim 8, wherein the phase difference is constantly regulated between a received pulse and one of the subsequent pulses that are to be emitted.

12. The method of claim 8, wherein the phase difference is constantly regulated between a received pulse and the subsequent pulse that is to be emitted.

13. The method of claim 1, wherein the transit time of the optical signal to and from the target object is computed, except for an offset that is to be calibrated, as an integral multiple of the period duration of the emitted signal.

14. A device for optically measuring a distance comprising means for emitting an amplitude modulated and bundled optical signal and receiving the signal reflected from the target object, with the modulation frequency being continuously controllable via a regulating loop such that between the emitted and the received signal a fixed phase difference prevails that is independent of the distance, wherein the phase difference is detectable with a phase comparator in such a manner that the phase comparator only compares whether the measured phase difference is greater or smaller than a desired phase difference, and wherein the regulating loop comprises a two-position control, which changes only the sign of the variation rate of the modulation frequency.

15. The device of claim 14, wherein the modulation frequency signal is generated by a VCO (voltage-controlled oscillator).

16. The device of claim 15, wherein the modulation frequency signal generated by the VCO is amplified by an amplifier that follows the VCO.

17. The device of claim 14, wherein the emitting means comprises a light source which is amplitude modulated with the modulation frequency signal.

18. The device of claim 17, wherein the light source includes an LED (light emitting diode) or a laser.

19. The device of claim 17, wherein the light of the light source is bundled with a focusing means which comprises a lens and/or a reflector mirror.

20. The device of claim 17, wherein the signal reflected from the target object is received by a light detector which comprises a photodiode, an avalanche diode, or a photomultiplier.

21. The device of claim 20, wherein the sign of the deviation of the actual phase position from the desired phase position between the modulation frequency signal and the detector output signal is determinable with the phase comparator.

22. The device of claim 14, wherein the output signal of the phase comparator is supplied to the regulating loop.

23. The device of claim 14, wherein a correction signal for the modulation frequency generator is generated with the regulating loop.

24. The device of claim 14, wherein the distance between the device and the target object is computed by measuring the modulation frequency.

* * * * *